United States Patent
Azami

(10) Patent No.: US 9,897,449 B2
(45) Date of Patent: Feb. 20, 2018

(54) DETERMINATION DEVICE, DETERMINATION METHOD, AND NON-TRANSITORY COMPUTER READABLE STORAGE MEDIUM

(71) Applicant: YAHOO JAPAN CORPORATION, Tokyo (JP)

(72) Inventor: Munehiro Azami, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 15/250,016

(22) Filed: Aug. 29, 2016

(65) Prior Publication Data

US 2017/0160088 A1 Jun. 8, 2017

(30) Foreign Application Priority Data

Dec. 7, 2015 (JP) ................... 2015-238994

(51) Int. Cl.
| | |
|---|---|
| *G01C 21/22* | (2006.01) |
| *G01C 21/28* | (2006.01) |
| *G01C 21/26* | (2006.01) |
| *G01C 21/34* | (2006.01) |
| *H04M 1/00* | (2006.01) |
| *G01C 21/12* | (2006.01) |
| *H04W 4/02* | (2018.01) |
| *G01S 19/13* | (2010.01) |

(52) U.S. Cl.
CPC ............. *G01C 21/12* (2013.01); *G01C 21/34* (2013.01); *G01S 19/13* (2013.01); *H04W 4/027* (2013.01)

(58) Field of Classification Search
CPC ......... G01C 21/12; G01C 21/34; G01S 19/13; H04W 4/027
See application file for complete search history.

(56) References Cited

U.S. PATENT DOCUMENTS

| | | | |
|---|---|---|---|
| 9,228,836 B2 * | 1/2016 | Girod | G01C 15/00 |
| 9,253,603 B1 * | 2/2016 | Dong | H04W 4/027 |
| 9,360,323 B2 * | 6/2016 | Grokop | G01C 21/165 |

(Continued)

FOREIGN PATENT DOCUMENTS

| | | |
|---|---|---|
| JP | 2003-106847 A | 4/2003 |
| JP | 2003-106854 A | 4/2003 |

(Continued)

OTHER PUBLICATIONS

Feb. 28, 2017 Office Action in Japanese Patent Application No. 2015-238994.

(Continued)

*Primary Examiner* — Michael J Zanelli
(74) *Attorney, Agent, or Firm* — Oliff PLC

(57) ABSTRACT

A determination device includes a detection unit that detects acceleration. The determination device includes a setting unit that sets a reference direction based on the acceleration detected by the detection unit. The determination device includes an acquisition unit that acquires a characteristic amount based on acceleration in a direction with respect to the reference direction set by the setting unit. The determination device includes a determination unit that determines a traveling state of a terminal device by using the characteristic amount acquired by the acquisition unit.

13 Claims, 9 Drawing Sheets

(56) References Cited

U.S. PATENT DOCUMENTS

| | | | | |
|---|---|---|---|---|
| 2013/0046505 A1* | 2/2013 | Brunner | ............... | G01C 21/165 |
| | | | | 702/141 |
| 2014/0149145 A1* | 5/2014 | Peng | ..................... | G06F 3/0346 |
| | | | | 705/4 |

FOREIGN PATENT DOCUMENTS

| | | | |
|---|---|---|---|
| JP | 2003-302237 | A | 10/2003 |
| JP | 2006-189297 | A | 7/2006 |
| JP | 4736866 | B2 | 7/2011 |
| JP | 2015-060311 | A | 3/2015 |
| JP | 2015-207186 | A | 11/2015 |

OTHER PUBLICATIONS

Aug. 8, 2017 Office Action issued in Japanese Patent Application No. 2017-090572.

\* cited by examiner

| STATE | SPEED RANGE | DATA#1 | DATA#2 | ... | DATA#10 |
|---|---|---|---|---|---|
| TRAVELING STATE | 55 km/h OR HIGHER | CHARACTERISTIC AMOUNT #7-1 | CHARACTERISTIC AMOUNT #7-2 | ... | CHARACTERISTIC AMOUNT #7-10 |
| | 45 km/h TO 55 km/h | CHARACTERISTIC AMOUNT #6-1 | CHARACTERISTIC AMOUNT #6-2 | ... | CHARACTERISTIC AMOUNT #6-10 |
| | 35 km/h TO 45 km/h | CHARACTERISTIC AMOUNT #5-1 | CHARACTERISTIC AMOUNT #5-2 | ... | CHARACTERISTIC AMOUNT #5-10 |
| | 25 km/h TO 35 km/h | CHARACTERISTIC AMOUNT #4-1 | CHARACTERISTIC AMOUNT #4-2 | ... | CHARACTERISTIC AMOUNT #4-10 |
| | 15 km/h TO 25 km/h | CHARACTERISTIC AMOUNT #3-1 | CHARACTERISTIC AMOUNT #3-2 | ... | CHARACTERISTIC AMOUNT #3-10 |
| | 5 km/h TO 15 km/h | CHARACTERISTIC AMOUNT #2-1 | CHARACTERISTIC AMOUNT #2-2 | ... | CHARACTERISTIC AMOUNT #2-10 |
| STOPPED STATE | 0 km/h TO 5 km/h | CHARACTERISTIC AMOUNT #1-1 | CHARACTERISTIC AMOUNT #1-2 | ... | CHARACTERISTIC AMOUNT #1-10 |
| | | ⋮ | ⋮ | ... | ⋮ |
| | | CHARACTERISTIC AMOUNT #1-51 | CHARACTERISTIC AMOUNT #1-52 | ... | CHARACTERISTIC AMOUNT #1-60 |

| STATE | TEST DATA#1 | TEST DATA#2 | ... |
|---|---|---|---|
| TRAVELING STATE | TEST DATA#2-1 | TEST DATA#2-2 | ... |
| STOPPED STATE | TEST DATA#1-1 | TEST DATA#1-2 | ... |

FIG.5

| MODEL ID | MODEL DATA | CORRECTNESS RATE [%] | USE FLAG |
|---|---|---|---|
| MODEL#1 | MODEL DATA#1 | 98 | 1 |
| MODEL#2 | MODEL DATA#2 | 88 | 0 |
| ⋮ | ⋮ | ⋮ | ⋮ |
| MODEL#10 | MODEL DATA#10 | 97 | 0 |

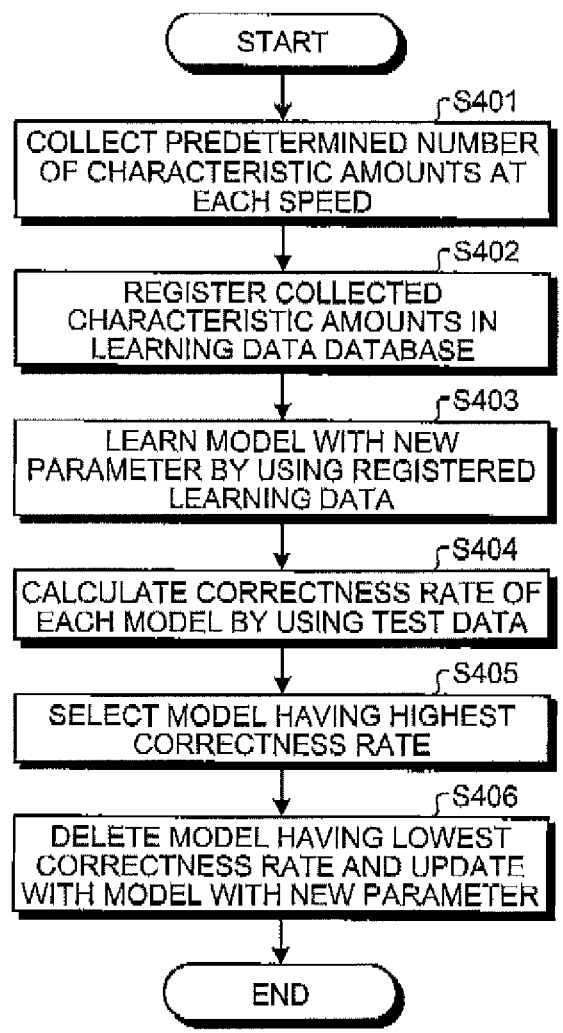

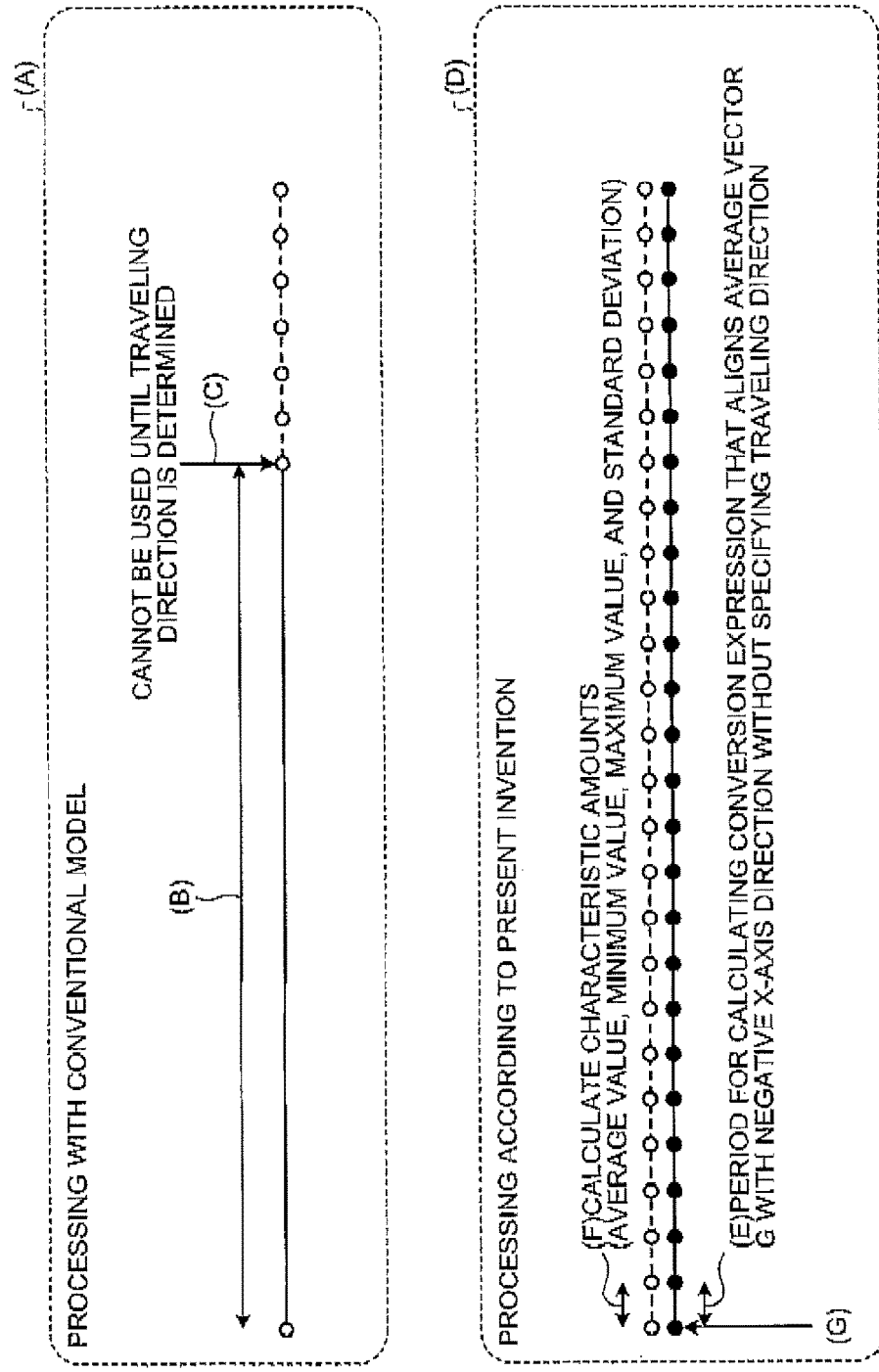

DETERMINATION DEVICE, DETERMINATION METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2015-238994 filed in Japan on Dec. 7, 2015.

BACKGROUND OF THE INVENTION

1. Field of the Invention

The present invention relates to a determination device, a determination method, and a determination program.

2. Description of the Related Art

In the conventionally known technology of vehicle navigation (hereinafter also referred to as "navigation"), a vehicle that a user is on board is navigated to a destination by using a mobile terminal device such as a smartphone. Such a terminal device that performs navigation specifies the current position of the vehicle by using a satellite positioning system such as the Global Positioning System (GPS), and displays the specified current position and a screen illustrating a map and a route in an overlapping manner.

However, the terminal device is unable to display the current position at places where it is difficult to receive signals from satellites, such as inside of a tunnel. This problem is not limited to the GPS but also occurs to general positioning technologies using external signals (for example, radio waves from a mobile phone (cellular) base station, and wireless LAN radio waves). For this problem, the autonomous positioning technology is available that estimates the current position of the vehicle based on acceleration measured by an acceleration meter. For example, in a disclosed method, a device including an acceleration meter is fixed inside the vehicle in a predetermined orientation, and the traveling state of the vehicle is determined based on acceleration detected by the device.

Patent Document 1: Japanese Patent No. 4736866.

However, a terminal device such as a smartphone has a different in-car installation orientation depending on, for example, the type of a car that a user is on board and the use condition of a holder holding the terminal device, and thus it is difficult to determine the traveling state of the vehicle in some cases.

For example, the terminal device includes an acceleration meter that detects acceleration in an axial direction with respect to the terminal device, and converts the direction of the detected acceleration into a direction with respect to the traveling direction of the vehicle based on the installation orientation of the terminal device. Then, the terminal device specifies the traveling direction and speed of the vehicle by using acceleration in the converted direction, and specifies the current position of the vehicle based on the specified traveling direction and speed. However, the terminal device is unable to convert the direction of the acceleration when the installation orientation is unknown or has changed, which degrades the accuracy of determination of the traveling state.

SUMMARY OF THE INVENTION

It is an object of the present invention to at least partially solve the problems in the conventional technology.

According to one aspect of an embodiment a determination device includes a detection unit that detects acceleration. The determination device includes a setting unit that sets a reference direction based on the acceleration detected by the detection unit. The determination device includes an acquisition unit that acquires a characteristic amount based on acceleration in a direction with respect to the reference direction set by the setting unit. The determination device includes a determination unit that determines a traveling state of a terminal device by using the characteristic amount acquired by the acquisition unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating exemplary information registered in a learning data database according to the embodiment;

FIG. 4 is a diagram illustrating exemplary information registered in a test data database according to the embodiment;

FIG. 5 is a diagram illustrating exemplary information registered in a model database according to the embodiment;

FIG. 9 is a flowchart of an exemplary process of learning processing executed by the terminal device according to the embodiment; and FIG. 10 is a diagram illustrating an exemplary time until stop determination is started.

DETAILED DESCRIPTION OF THE PREFERRED EMBODIMENTS

Figure 1:
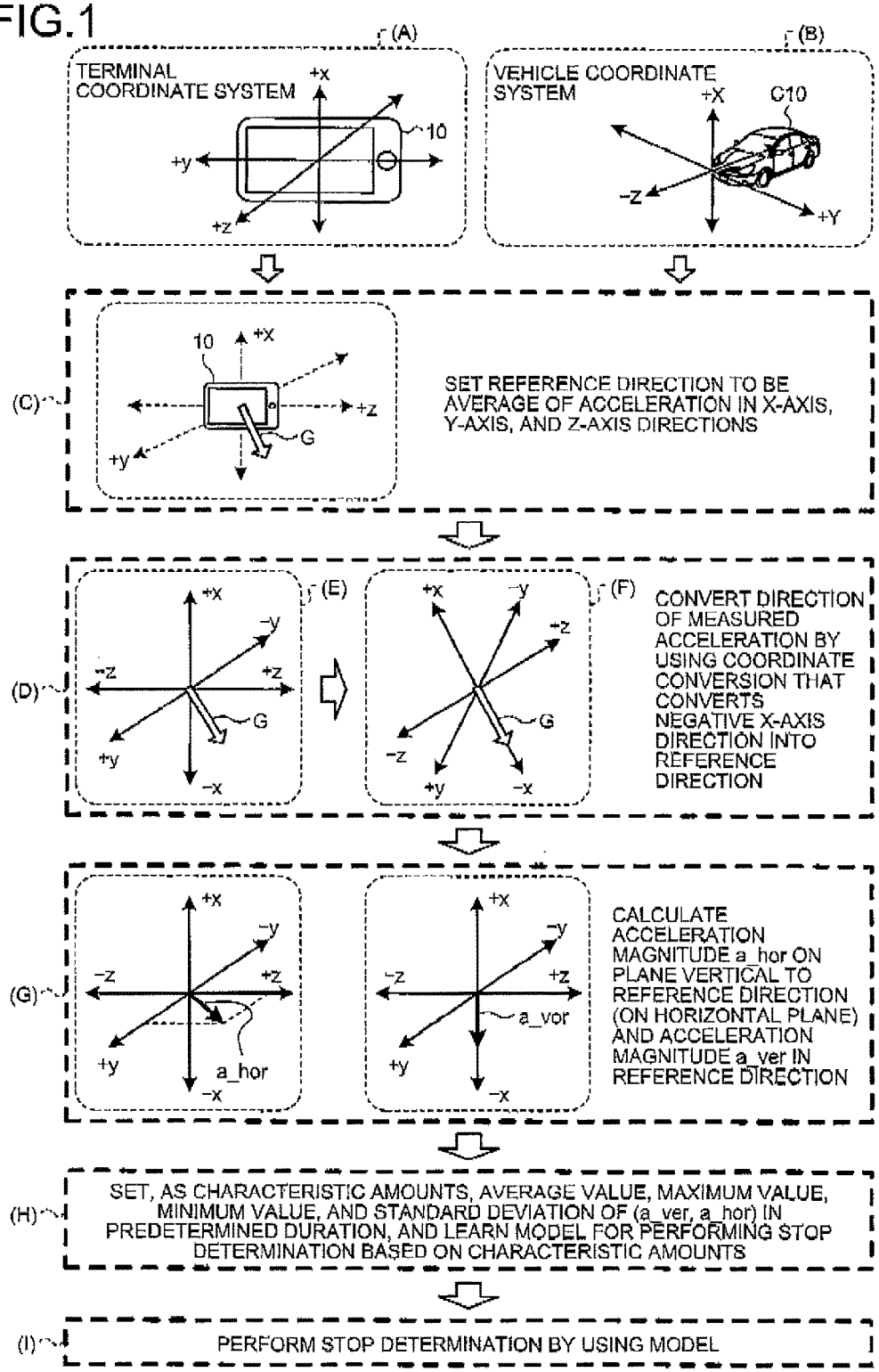
FIG. 1 is a diagram illustrating an exemplary effect achieved by a terminal device according to an embodiment.

Configurations (hereinafter referred to as "embodiments") of a determination device, a determination method, and a non-transitory computer readable storage medium according to the present application will be described below in detail with reference to the accompanying drawings. The determination device, the determination method, and the non-transitory computer readable storage medium according to the present application are not limited by these embodiments. In the following embodiments, any identical part or processing is denoted by an identical reference numeral, and any duplicate description thereof will be omitted.

The following describes, as processing executed by the determination device, exemplary vehicle navigation in which a vehicle that a user is on board is navigated to a destination, but the embodiments are not limited thereto. For example, the determination device may execute processing described below and execute processing of navigating the user to the destination in a case in which the user is walking or on board transportation means other than a vehicle such as a train.

1. Outline of Traveling State

The concept of a traveling state determined by a terminal device 10 as an exemplary determination device will be first described with reference to FIG. 1. FIG. 1 is a diagram illustrating an exemplary affect achieved by the terminal device according to an embodiment. For example, the terminal device 10 is a mobile terminal such as a smartphone, a tablet terminal, or a personal digital assistant (PDA), or a terminal device such as a laptop personal computer (PC). The terminal device 10 is a terminal device capable of communicating with a certain server through a network N such as a mobile communication network or a wireless local area network (LAN).

The terminal device 10 has a vehicle navigation function that navigates a vehicle C10 that a user is on board to a destination. For example, having received inputting of a destination from the user, the terminal device 10 acquires route information for guiding the user to the destination, from a server (not illustrated) for example. The route information includes a route to the destination that the vehicle C10 can take, information on an expressway included in the route, information on congestion on the route, facilities serving as landmarks for navigation, information on a map displayed on a screen, and data of sound and an image such as a map output in navigation.

The terminal device 10 has a positioning function of specifying the position (hereinafter referred to as the "current position") of the terminal device 10 at a predetermined time interval by using a satellite positioning system such as the Global Positioning System (GPS). The terminal device 10 displays an image such as a map included in the route information on a liquid crystal screen, an electroluminescence screen, or a light emitting diode (LED) screen (hereinafter simply referred to as a "screen"), and displays the current position on the map each time the current position is specified. The terminal device 10 displays a left turn or a right turn, a change of a traffic lane to be used, an expected arrival time to the destination, and the like in accordance with the specified current position or outputs such information in sound through, for example, a speaker of the terminal device 10 or the vehicle C10.

In the satellite positioning system, signals emitted from a plurality of satellites are received and used to specify the current position of the terminal device 10. Thus, the terminal device 10 is unable to specify the current position, for example, inside of a tunnel or at a place surrounded by buildings, where the signals emitted from the satellites are unable to be received appropriately. In addition, an application or the like that causes the terminal device 10 to perform navigation does not have a function of acquiring information such as the speed and traveling direction of the vehicle C10 therefrom. Thus, in some methods, an acceleration sensor that measures acceleration is installed in the terminal device 10, and the position of the terminal device 10 is estimated based on acceleration measured by the acceleration sensor. For example, in such a method, stop determination that determines whether the terminal device 10 is traveling or stopping is performed based on the acceleration measured by the acceleration sensor.

The following describes a more specific example. For example, if signals emitted from the satellites cannot be appropriately received, the terminal device 10 determines that the vehicle C10 is, for example, in a tunnel, and travels forward an estimated position using the last specified vehicle speed and traveling direction. Then, the terminal device 10 determines whether the vehicle C10 is stopped based on the measured acceleration. If it is determined that the vehicle C10 is stopped, the movement of the estimated position is stopped.

1-1. Exemplary Stop Determination Technology

This section describes an exemplary stop determination technology of determining whether the vehicle C10 is stopped. The technology described in this section is an exemplary technology prior to the present embodiment, but does not belong to the original conventional technology. In other words, the technology described in this section is a technology secretly achieved by the applicant for development, examination, research, and the like, and is not a technology publicly known, publicly used, or known through publication with the secret thereof being disclosed.

For example, as illustrated in (A) of FIG. 1, the terminal device 10 measures acceleration in x-axis, y-axis, and z-axis directions where an x-axis represents a shorter direction of the screen, a y-axis represents a longer direction of the screen, and a z-axis represents a direction vertical to the screen. For example, the terminal device 10 measures acceleration in such a terminal coordinate system that the positive z-axis direction is toward the front side and the negative z-axis direction is toward the back side when the screen is placed at the front, and the positive x-axis direction is toward the upper side of the screen, the negative x-axis direction is toward the lower side of the screen, the positive y-axis direction is toward the left side of the screen, and the negative y-axis direction is toward the right side of the screen when the terminal device 10 is in use.

As illustrated in (B) of FIG. 1, the traveling direction and speed of the vehicle C10 in which the user is on board are defined in the coordinate system of the vehicle C10 in which a Z-axis is in a direction in which the vehicle C10 travels, a Y-axis is in a direction in which the vehicle C10 turns left and right on a plane vertical to the Z-axis, and an X-axis is in the up-down direction of the vehicle C10. For example, the traveling direction and speed of the vehicle C10 are defined in a vehicle coordinate system in which the positive X-axis direction is in the up direction of the vehicle C10, the negative X-axis direction is in the down direction (in other words, on the ground side) of the vehicle C10, the positive Y-axis direction is in a direction into which the vehicle C10 turns left, the negative Y-axis direction is a direction into which the vehicle C10 turns right, the positive Z-axis direction is in the rear direction of the vehicle C10, and the negative Z-axis direction is in the front direction of the vehicle C10.

The terminal device 10 sets the gravitational direction, in other words, the negative X-axis direction of the vehicle coordinate system by using the acceleration measured in the terminal coordinate system, specifies the traveling direction of the vehicle C10 by using acceleration generated when the vehicle C10 travels, and calculates a rotation matrix that converts the acceleration measured in the terminal coordinate system into the vehicle coordinate system, based on an estimated reference direction and the traveling direction. Then, the terminal device 10 converts the acceleration in the terminal coordinate system into the acceleration in the vehicle coordinate system by using the rotation matrix, and acquires a total of 18 characteristic amounts of the amplitude, the frequency, the average value, the standard deviation, the maximum value, and the minimum value of the converted acceleration in the axial directions.

The terminal device 10 accumulates a characteristic amount as a characteristic amount of the traveling vehicle C10 if it is acquired when the speed of the vehicle C10 is equal to or higher than a predetermined threshold, and accumulates a characteristic amount as a characteristic amount of the stopped vehicle C10 if it is acquired when the speed of the vehicle C10 is lower than the predetermined threshold. Then, the terminal device 10 learns a stop determination model (achieved by, for example, a support vector machine (SVM) to be described later) that determines whether the vehicle C10 is stopped, by using the accumulated characteristic amount, and determines whether the vehicle C10 is stopped at a place such as inside of a tunnel where the satellite positioning system is unavailable, by using the learned stop determination model.

However, in such a technology, the traveling direction of the vehicle C10 is specified by using the acceleration generated when the vehicle C10 travels, and thus the vehicle C10 needs to travel for a certain duration so as to calculate the rotation matrix. As a result, for example, when the vehicle C10 enters a tunnel shortly after navigation has started, the rotation matrix is unable to be calculated and thus the stop determination is unable to start.

In addition, some users bring the terminal device 10 with them when getting off the vehicle at, for example, a rest area. As a result, the rotation matrix changes when the orientation of the terminal device 10 changes, and thus the traveling direction needs to be specified again to calculate the rotation matrix based on the specified traveling direction and the reference direction. Even when such processing is executed, however, the stop determination is unable to start until the traveling direction is specified. When a road is inclined, a shift is generated between the terminal coordinate system and the vehicle coordinate system, and thus error is more likely to occur.

In another method, the average value of the acceleration measured in the terminal coordinate system is calculated without the coordinate conversion, and the stop determination model is learned from a characteristic amount based on the calculated average value. In such a method, however, the stop determination model must be learned each time the navigation starts because the installation orientation of the terminal device 10 is unknown. Even in this method, the stop determination model needs to be learned every time when the installation orientation of the terminal device 10 changes, and error is more likely to occur when a road is inclined.

In particular, when the coordinate conversion is performed on acceleration measured in the terminal coordinate system, the same stop determination model can be used again by specifying the rotation matrix in accordance with the traveling direction of the vehicle C10. Without the coordinate conversion on the acceleration, the stop determination model needs to be learned again when the installation orientation of the terminal device 10 changes or every time the navigation starts.

2. Determination Processing Executed by the Terminal Device 10 According to the Embodiment The terminal device 10 executes determination processing described below. For example, the terminal device 10 detects acceleration in the terminal coordinate system. The terminal device 10 sets a reference direction based on the detected acceleration. Then, the terminal device 10 acquires a characteristic amount based on acceleration in a direction with respect to the specified reference direction. Thereafter, the terminal device 10 determines the traveling state of the terminal device 10 by using the acquired characteristic amount.

The following describes exemplary functional configuration and effect of the terminal device 10 that achieves the determination processing described above with reference to drawings.

2-1. Exemplary Functional Configuration

Figure 2:
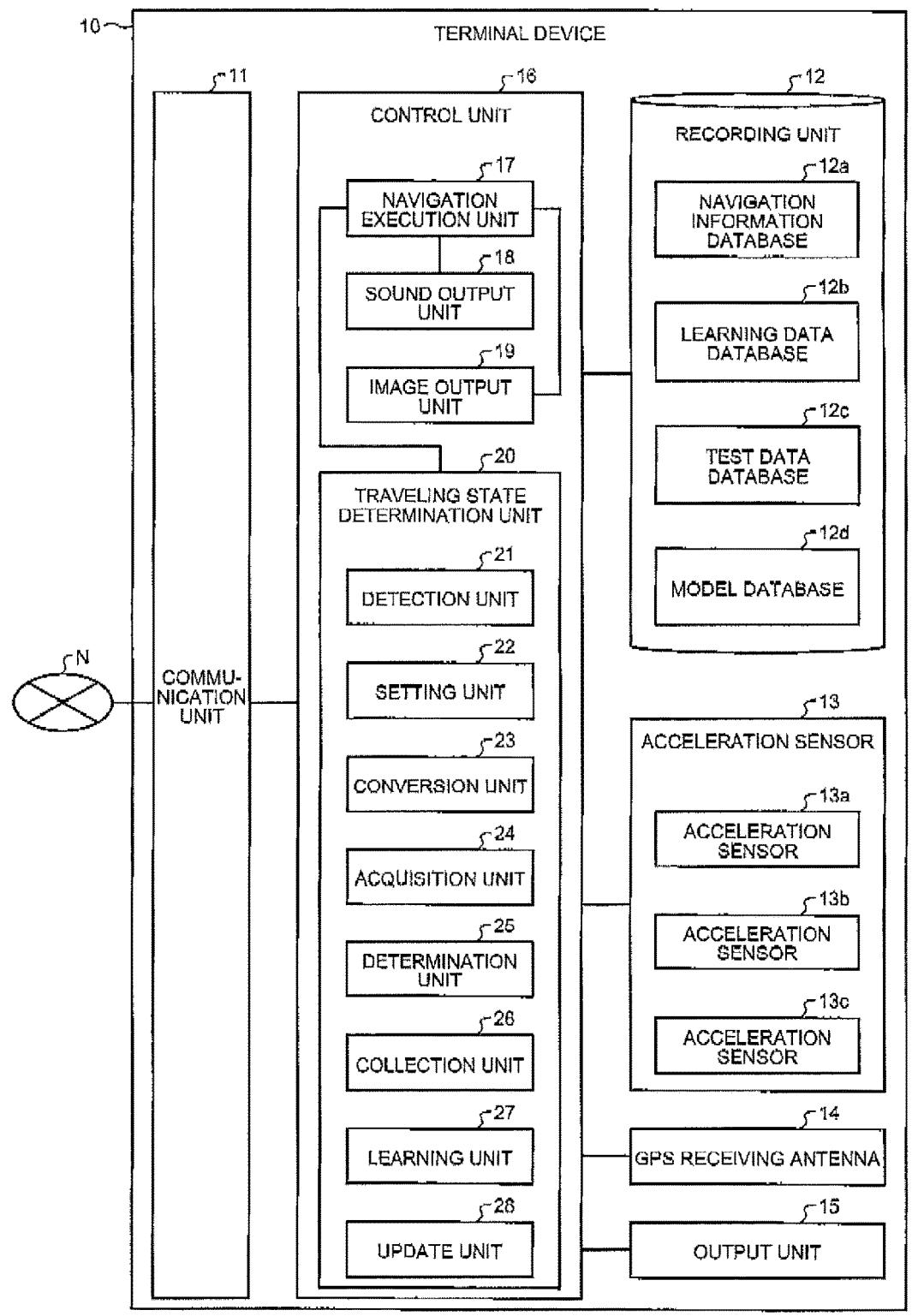
FIG. 2 is a diagram illustrating an exemplary functional configuration of the terminal device according to the embodiment.

FIG. 2 is a diagram illustrating an exemplary functional configuration of the terminal device according to the embodiment. As illustrated in FIG. 2, the terminal device 10 includes a communication unit 11, a recording unit 12, a plurality of acceleration sensors 13a to 13c (hereinafter also collectively referred to as an "acceleration sensor 13"), a GPS receiving antenna 14, an output unit 15, and a control unit 16. The communication unit 11 is, for example, a network interface card (NIC). The communication unit 11 is connected with the network N in a wired or wireless manner. Having received a destination from the terminal device 10, the communication unit 11 communicates information between the terminal device 10 and a delivery server that delivers route information indicating a route to the destination.

The recording unit 12 is, for example, a semiconductor memory element such as a random access memory (RAM) or a flash memory, or a storage device such as a hard disk or an optical disk. The recording unit 12 includes a navigation information database 12a, a learning data database 12b, a test data database 12c, and a model database 12d that store therein various pieces of data used to execute navigation.

The navigation information database 12a registers therein various pieces of data used by the terminal device 10 performing navigation. For example, the navigation information database 12a stores therein the route information to a destination received from, for example, a server not illustrated. The navigation information database 12a stores therein, for example, various kinds of images and sound data that are output in navigation.

The learning data database 12b registers therein learning data used to learn the stop determination model. Specifically, the learning data database 12b registers therein a predetermined number of characteristic amounts collected at each traveling speed of the terminal device 10.

FIG. 3 is a diagram illustrating exemplary information registered in the learning data database according to the embodiment. As illustrated in FIG. 3, the learning data database 12b registers therein information including items of "State", "speed range", and "data #1" to "data #10". The item of "state" is information indicating whether associated learning data is data indicating a traveling state or data indicating a stopped state. The item of "speed range" is information indicating the traveling speed of the terminal device 10 at the timing when an associated characteristic amount is collected. The items of "data #1" to "data #10" are data of characteristic amounts.

For example, in the example illustrated in FIG. 3, the learning data database 12b registers therein, as learning data indicating "stopped state", "characteristic amount #1-1" to "characteristic amount #1-60" that are data of characteristic amounts collected when the traveling speed of the terminal device 10 is "0 km/h (kilometer per hour) to 5 km/h". The learning data database 12b registers therein, as learning data indicating "traveling state", "characteristic amount #2-1" to "characteristic amount #2-10" that are data of characteristic amounts collected when the traveling speed of the terminal device 10 is "5 km/h (kilometer per hour) to 15 km/h".

The learning data database 12*b* additionally registers therein 10 pieces of data of characteristic amounts collected when the traveling speed of the terminal device 10 is in each of the speed ranges of "15 km/h (kilometer per hour) to 25 km/h", "25 km/h to 35 km/h", "35 km/h to 45 km/h", "45 km/h to 55 km/h", and "55 km/h or higher".

In other words, in the example illustrated in FIG. 3, the learning data database 12*b* registers therein 60 pieces of learning data indicating the traveling state and 60 pieces of learning data indicating the stopped state. In the example illustrated in FIG. 3, a conceptual value such as "characteristic amount #1-1" is listed as data indicating a characteristic amount, but the embodiment is not limited thereto. It becomes clear in later description that the learning data database 12*b* registers therein, as data indicating characteristic amounts, the average value, the standard deviation, the maximum value, and the minimum value of a pair of the magnitude of acceleration in the reference direction and the magnitude of acceleration on a plane vertical to the reference direction.

The test data database 12*c* registers therein characteristic amounts as a model for determining the traveling state of the terminal device 10, in other words, test data used to test the stop determination model. For example, FIG. 4 is a diagram illustrating exemplary information registered in the test data database according to the embodiment. As illustrated in FIG. 4, the test data database 12*c* registers therein information including items of "state", "test data #1", "test data #2", and the like. The item of "state" illustrated in FIG. 4 is information indicating whether associated test data is data indicating the traveling state or data indicating the stopped state. The items of "test data #1" and "test data #2" are data of characteristic amounts indicating the traveling state or the stopped state.

For example, in the example illustrated in FIG. 4, the test data database 12*c* registers therein "test data #1-1" and "test data #1-2" as test data indicating "stopped state" and registers therein "test data #2-1" and "test data #2-2" as test data indicating "traveling state". The test data database 12*c* registers therein a plurality of pieces of test data indicating "stopped state" and "traveling state" (for example, 60 pieces of test data each) in addition to the test data illustrated in FIG. 4. The test data database 12*c* registers therein a larger number of characteristic amounts as test data than those in the learning data database 12*b*.

The model database 12*d* stores therein a plurality of models for determining the traveling state of the terminal device 10 when a characteristic amount based on acceleration is input, which are models with different parameters, in other words, a plurality of stop determination models. Each stop determination model is achieved by, for example, a support vector machine (SVM).

For example, FIG. 5 is a diagram illustrating exemplary information registered in the model database according to the embodiment. As illustrated in FIG. 5, the model database 12*d* registers therein information including items of "model ID (identifier)", "model data", "correctness rate (%)", and "use flag". The item of "model ID" is the identifier of a model. The item of "model data" is learned model data.

The item of "correctness rate (%)" is a correctness rate in percentage when a model is tested by using test data. The item of "use flag" is information indicating a model used by the terminal device 10 as the stop determination model from among models registered in the model database 12*d*. In the example illustrated in FIG. 5, model data of ten models indicated by the model IDs of "model #1" to "model #10" is stored, but the embodiment is not limited thereto, and model data of a certain number of models may be registered.

For example, in the example illustrated in FIG. 5, the model database 12*d* registers therein "model data #1" as data of a model indicated by "model #1", and "98" % as the correctness rate of the model indicated by "model #1" when test data is used. The model database 12*d* registers therein information indicating that the model indicated by "model #1" is used from among models indicated by "model #1" to "model #10".

The following description is made with reference to FIG. 2. An acceleration sensor 13 measures the magnitude and direction of acceleration exerted on the terminal device 10 at a predetermined time interval (for example, five milliseconds). For example, the acceleration sensor 13*a* measures acceleration in the x-axis direction of the terminal coordinate system. The acceleration sensor 13*b* measures acceleration in the y-axis direction of the terminal coordinate system. The acceleration sensor 13*c* measures acceleration in the z-axis direction of the terminal coordinate system. In other words, the terminal device 10 can acquire a vector representing the direction and magnitude of acceleration with respect to the terminal device 10 by setting the acceleration measured by the acceleration sensors 13*a* to 13*c* to be acceleration in the axial directions of the terminal coordinate system.

The GPS receiving antenna 14 is an antenna for receiving, from satellites, signals used in the satellite positioning system such as the GPS. The output unit 15 includes the screen for displaying a map and the current position when navigation is performed, and the speaker for outputting sound.

The control unit 16 is achieved by, for example, a central processing unit (CPU), a micro processing unit (MPU), an application specific integrated circuit (ASIC), or a field programmable gate array (FPGA) executing various kinds of computer programs stored in a storage device inside the terminal device 10 by using a storage region such as a RAM as a work area. In the example illustrated in FIG. 2, the control unit 16 includes a navigation execution unit 17, a sound output unit 18, an image output unit 19, and a traveling state determination unit 20 (hereinafter also collectively referred to as processing units 17 to 20). The traveling state determination unit 20 includes a detection unit 21, a setting unit 22, a conversion unit 23, an acquisition unit 24, a determination unit 25, a collection unit 26, a learning unit 27, and an update unit 28.

A connection relation among the processing units 17 to 20 included in the control unit 16 is not limited to the connection relation illustrated in FIG. 2, but may be any other connection relation. The processing units 17 to 20 achieve and execute the functions and effects (for example, FIG. 1) of navigation processing as described below, but these units are in functional units organized for description and do not necessarily represent actual hardware elements and software modules. In other words, the terminal device 10 may achieve and execute the navigation processing in certain function units that can achieve and execute the function and effect of the navigation processing.

2-2. Exemplary Effect of Navigation Processing

Figure 6:
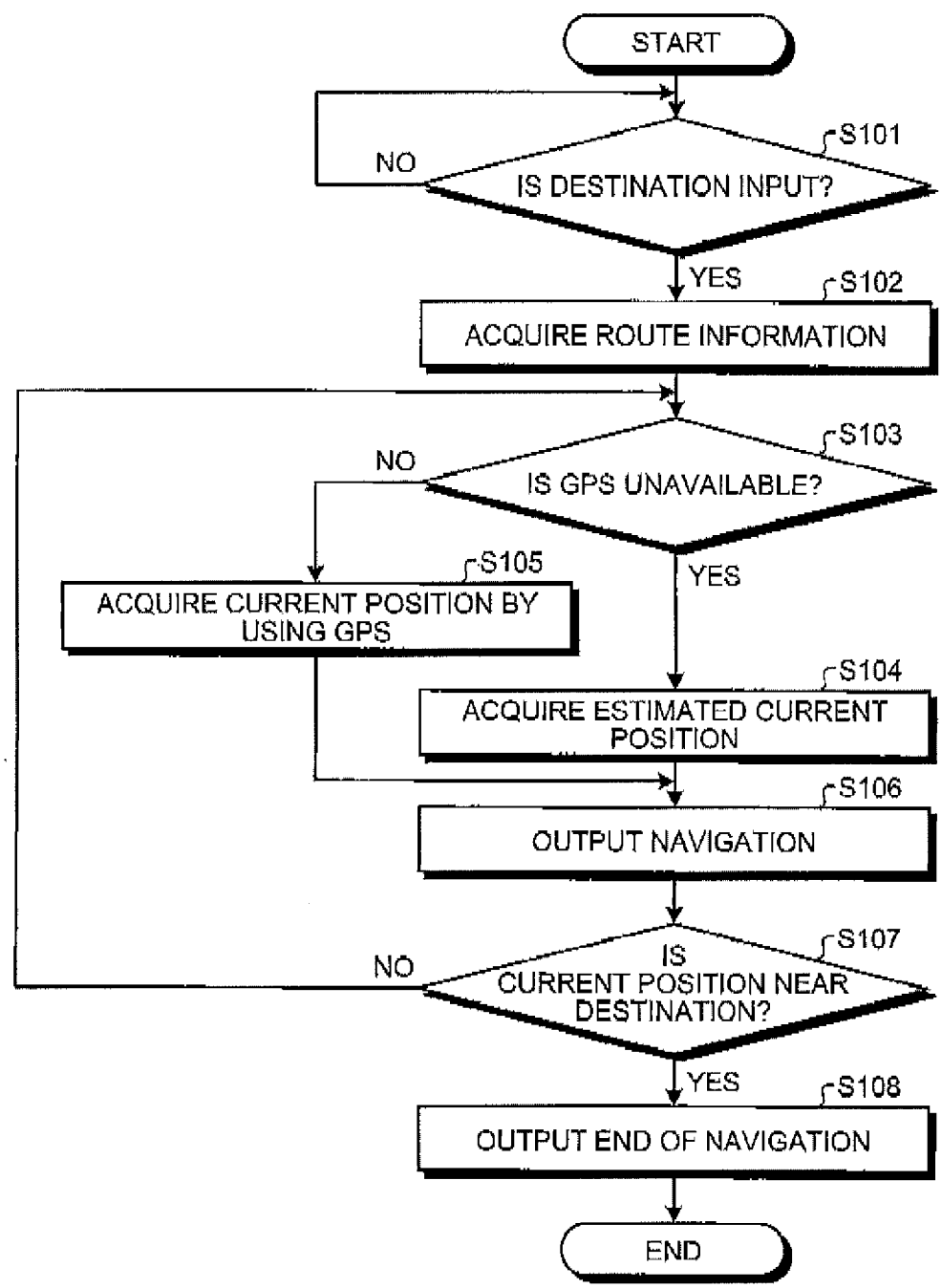
FIG. 6 is a flowchart of an exemplary process of navigation processing executed by the terminal device according to the embodiment.

The following describes the content of the navigation processing executed and achieved by the processing units 17 to 20 with reference to a flowchart illustrated in FIG. 6. FIG. 6 is a flowchart of an exemplary process of the navigation processing executed by the terminal device according to the embodiment.

First, the navigation execution unit 17 determines whether a destination is input by the user (step S101). If a destination is input (Yes at step S101), the navigation execution unit 17 acquires route information from an external server not illustrated (step S102). Then, the navigation execution unit 17 determines whether the GPS is available (step S103).

For example, the navigation execution unit 17 determines that the GPS is unavailable, for example, if the GPS receiving antenna 14 cannot receive signals from satellites or if the number of satellites from which signals have been received is smaller than a predetermined threshold (Yes at step S103). The navigation execution unit 17 then acquires a current position based on the traveling direction and speed of the vehicle C10 estimated by the traveling state determination unit 20 (step S104). For example, the navigation execution unit 17 acquires the current position estimated by the traveling state determination unit 20. Specific content of the processing in which the traveling state determination unit 20 estimates the current position of the vehicle C10 will be described later.

Having determined that the GPS can be used (No at step S103), the navigation execution unit 17 specifies a current position by using the GPS (step S105). Then, the navigation execution unit 17 controls the sound output unit 18 and the image output unit 19 so as to output navigation by using the current position obtained by using the GPS or the estimated current position (step S106). For example, the sound output unit 18 outputs, from the output unit 15 under control of the navigation execution unit 17, sound indicating, for example, the current position and a direction in which the vehicle C10 needs to travel ahead. The image output unit 19 outputs, from the output unit 15 under control of the navigation execution unit 17, for example, an image illustrating the current position and a map thereof in an overlapping manner and an image illustrating a direction in which the vehicle C10 needs to travel ahead.

Subsequently, the navigation execution unit 17 determines whether the current position is near the destination (step S107). Having determined that the current position is near the destination (Yes at step S107), the navigation execution unit 17 controls the sound output unit 18 and the image output unit 19 to output end navigation indicating the end of navigation (step S108), and ends the present processing. Having determined that the current position is not near the destination (No at step S107), the navigation execution unit 17 executes step S103. If no destination is input (No at step S107), the navigation execution unit 17 waits for the input.

2-3. Exemplary Effect of Determination Processing

Figure 7:
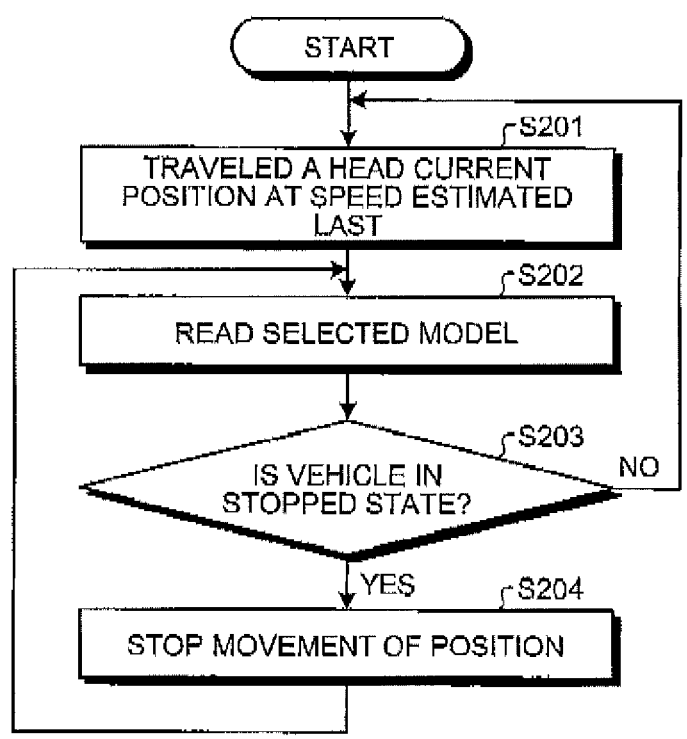
FIG. 7 is a flowchart of an exemplary process of determination processing executed by the terminal device according to the embodiment.

The following describes the content of the determination processing executed and achieved by the determination unit 25 with reference to a flowchart illustrated in FIG. 7. FIG. 7 is a flowchart of an exemplary process of the determination processing executed by the terminal device according to the embodiment. For example, if it is determined that the GPS cannot be used at step S103 in FIG. 6, the determination unit 25 executes the determination processing illustrated in FIG. 7. A result of the determination processing illustrated in FIG. 7 is output to the navigation execution unit 17 as the current position estimated by the traveling state determination unit 20.

First, the determination unit 25 estimates the current position by assuming that the vehicle C10 has traveled ahead in a traveling direction measured when the GPS becomes unavailable, from a position at which the GPS becomes unavailable, at a speed measured when the GPS becomes unavailable (step S201). For example, if the vehicle C10 enters a tunnel, the determination unit 25 estimates the current position by assuming that the vehicle C10 is traveling ahead in a direction when the vehicle C10 enters the tunnel, at a speed when the vehicle C10 enters the tunnel. The determination unit 25 may acquire information of a route on which the vehicle C10 is traveling from the navigation information database 12a, and estimate that the vehicle C10 is traveling along the acquired route.

Subsequently, the determination unit 25 reads a selected model, in other words, a model having a use flag of "1" from the model database 12d (step S202). The model read by the determination unit 25 is learned and selected by acquisition processing and learning processing to be described later.

Then, the determination unit 25 determines whether the vehicle C10 is in the stopped state by using the read model (step S203). Specifically, the determination unit 25 determines whether the vehicle C10 is in the stopped state by inputting, into the read model, a characteristic amount acquired by the acquisition unit 24 to be described later. In other words, the determination unit 25 determines the traveling state of the terminal device 10 by using a model that has learned a characteristic of the characteristic amount. In this manner, the determination unit 25 determines the traveling state of the terminal device 10 by using the characteristic amount acquired by the acquisition unit 24.

Then, if is determined that the vehicle C10 is in the stopped state (Yes at step S203), the determination unit 25 stops the movement of an estimated current position (step S204). It is determined that the vehicle C10 is not in the stopped state (No at step S203), the determination unit 2S executes step S201. For example, if is determined that the vehicle C10 is in the traveling state after determined that the vehicle C10 is in the stopped state, the determination unit 25 estimates the current position by assuming that the vehicle C10 has started traveling ahead in the direction in which the vehicle C10 has entered the tunnel, at the speed at which the vehicle C10 has entered the tunnel.

2-4. Exemplary Effect of Acquisition Processing

Figure 8:
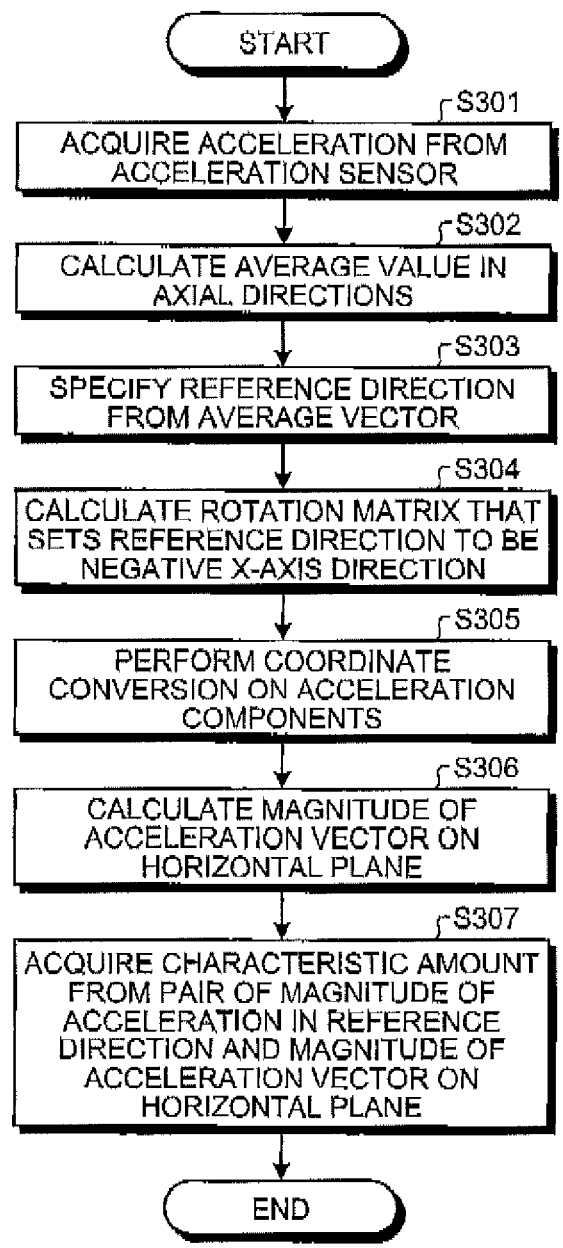
FIG. 8 is a flowchart of an exemplary process of acquisition processing executed by the terminal device according to the embodiment.

The following describes the content of the acquisition processing executed and achieved by the detection unit 21, the setting unit 22, the conversion unit 23, and the acquisition unit 24 with reference to a flowchart illustrated in FIG. 8. FIG. 8 is a flowchart of an exemplary process of the acquisition processing executed by the terminal device according to the embodiment. The detection unit 21, the setting unit 22, the conversion unit 23, and the acquisition unit 24 execute the acquisition processing illustrated in FIG. 8 in a cycle of a predetermined duration (for example, one second).

For example, the detection unit 21 acquires acceleration from the acceleration sensor 13 (step S301). Specifically, the acceleration sensor 13 acquires the magnitude of acceleration measured in each of the x-axis, y-axis, and z-axis directions of the terminal coordinate system at a predetermined time interval. The detection unit 21 calculates the average value of the magnitude of acceleration measured by the acceleration sensor 13 in the predetermined duration, for each axial direction of the terminal coordinate system (step S302). For example, the detection unit 21 collects, for one second, acceleration in the terminal coordinate system detected by the acceleration sensor 13 at every five milliseconds. Then, the detection unit 21 calculates an average value $x_m$ of the collected acceleration in the x-axis direction, an average value $y_m$ thereof in the y-axis direction, and an average value $z_m$ thereof in the z-axis direction, and sets an average vector G to be a vector $(x_m, y_m, z_m)$ made of the calculated average values in the axial directions.

Subsequently the setting unit 22 sets the reference direction based on the acceleration calculated by the detection unit 21 (step S303). More specifically, the setting unit 22 sets the reference direction to be the direction of the average vector G made of the average values of the acceleration calculated by the detection unit 21 as illustrated in (C) of FIG. 1.

Subsequently, the conversion unit 23 calculates a rotation matrix that aligns a predetermined axial direction of the terminal coordinate system with the reference direction set by the setting unit 22 (step S304). Then, the conversion unit 23 converts, by using the calculated rotation matrix, each component of the acceleration acquired in the terminal coordinate system by the detection unit 21 (step S305). In other words, the conversion unit 23 converts the acceleration acquired by the detection unit 21 into acceleration in a coordinate system with respect to the reference direction instead of the vehicle coordinate system.

For example, as illustrated in (D) of FIG. 1, the setting unit 22 sets the direction of the average vector G of the acceleration as a reference. Then, as illustrated in (E) of FIG. 1, the conversion unit 23 calculates a rotation matrix that aligns the negative x-axis direction of the terminal coordinate system with the direction of the average vector G. The conversion unit 23 may employ any rotation matrix that aligns the negative x-axis direction of the terminal coordinate system with the direction of the average vector G. In other words, the conversion unit 23 may employ a rotation matrix that rotates the y-axis direction or the z-axis direction in a certain direction.

Then, as illustrated in (F) of FIG. 1, the conversion unit 23 converts the acceleration measured in the terminal coordinate system into a coordinate system (hereinafter referred to as an estimation coordinate system) with respect to the average values of the acceleration by using the calculated rotation matrix: In the following description, the negative x-axis direction is defined to be the direction of the average vector G in the estimation coordinate system. In the following description, the negative x-axis direction in the estimation coordinate system is also referred to as the reference direction.

Subsequently, the acquisition unit 24 calculates the magnitude of an acceleration vector on a plane (hereinafter referred to as a horizontal plane) vertical to the direction of the average vector, in other words, on the yz plane in the estimation coordinate system (step S306). Then, the acquisition unit 24 acquires a characteristic amount based on a pair of the magnitude of the average vector and the magnitude of the acceleration vector on the horizontal plane (step S307).

For example, as illustrated in (G) of FIG. 1, the acquisition unit 24 calculates, among axial components of the acceleration provided with the coordinate conversion by the conversion unit 23, a pair of a magnitude "a_hor" of acceleration on the horizontal plane and a magnitude "a_ver" of acceleration of the average vector G, in other words, the magnitude of acceleration in the reference direction in the estimation coordinate system. More specifically, the acquisition unit 24 calculates the square root of the sum of the square of the component "a_y" and the square of the component "a_z" to be "a_hor", where "a_x, a_y, a_z" represent the components of the acceleration in the estimation coordinate system.

Then, as illustrated in (H) of FIG. 1, the acquisition unit 24 acquires, as characteristic amounts, the average value, the maximum value, the minimum value, and the standard deviation of the calculated pair of "a_hor" and "a_ver", in other words, "(a_ver, a_hor)" as a pair of the magnitude of acceleration on the horizontal plane and the magnitude of acceleration in the reference direction, in the predetermined duration. The acquisition unit 24 may acquire, as a characteristic amount, at least one of the average value, the maximum value, the minimum value, and the standard deviation of "(a_ver, a_hor)" in the predetermined duration. In this manner, the acquisition unit 24 acquires the characteristic amounts based on the acceleration in a direction with respect to the reference direction. Then, the determination unit 25 determines the traveling state of the terminal device 10 by using the characteristic amounts acquired by the acquisition unit 24.

In this manner, the terminal device 10 sets, without calculating the gravitational direction and the traveling direction of the vehicle C10, the direction of the average vector as a reference direction for performing the stop determination. It is presumed that the average vector indicates the direction of the gravitational acceleration when the vehicle C10 is stopped or traveling at a constant speed. Thus, when the vehicle C10 is stopped or traveling at a constant speed, the reference direction is aligned with the direction of the gravitational acceleration. When the vehicle C10 is accelerating or decelerating, it is presumed that the direction of the average vector G is shifted from the direction of the gravitational acceleration.

It becomes clear in later description, however, that the terminal device 10 learns a model for performing the stop determination, by using a characteristic amount based on acceleration. More specifically, the terminal device 10 learns a model for performing the stop determination, based on a characteristic amount of acceleration when the vehicle C10 is traveling, and a characteristic amount of acceleration when the vehicle C10 is stopped. A model that performs such learning allows determination of whether the vehicle C10 is stopped based on the characteristic amounts irrespective of the gravitational direction and the traveling direction of the vehicle C10, and thus can absorb the influence of any error that may exist in the direction of the average vector G and the direction of the gravitational acceleration.

2-5. Exemplary Effect of Learning Processing

The following describes the content of the learning processing executed and achieved by the collection unit 26, the learning unit 27, and the update unit 28 with reference to a flowchart illustrated in FIG. 9. FIG. 9 is a flowchart of an exemplary process of the learning processing executed by the terminal device according to the embodiment. The collection unit 26, the learning unit 27, and the update unit 28 may execute the processing illustrated in FIG. 9, for example, each time a characteristic amount is acquired by the acquisition unit 24, or at a predetermined time interval. The processing illustrated in FIG. 9 is always executed while an application that achieves navigation is being executed.

For example, the collection unit 26 collects a predetermined number of characteristic amounts acquired by the acquisition unit 24 at each traveling speed of the terminal device 10 (step S401). More specifically, the collection unit 26 sequentially collects a predetermined number of latest characteristic amounts from among characteristic amounts acquired by the acquisition unit 24 at each traveling speed of the terminal device 10. Then, the collection unit 26 registers the collected characteristic amounts in the learning data database 12*b* (step S402).

Specifically, when the acquisition unit 24 has acquired characteristic amounts, the collection unit 26 specifies the traveling speed of the terminal device 10 by using the positioning system such as the GPS. Then, the collection unit 26 registers, in the learning data database 12b, the acquired characteristic amounts as learning data in association with a speed range including the specified traveling speed. If the number of pieces of learning data associated with the speed range including the specified traveling speed has reached an upper limit (for example, "10" for the traveling state, and "60" for the stopped state), the collection unit 26 updates the oldest learning data among the associated learning data to a newly acquired characteristic amount.

In other words, if a characteristic amount of which the speed specified by using the GPS is equal to or lower than the predetermined threshold is set to be a characteristic amount indicating the stopped state, and any other characteristic amount is set to be a characteristic amount indicating the traveling state, bias in collected characteristic amounts leads to degradation of a model determination accuracy. For example, when a model is learned with learning data in which a majority of characteristic amounts are collected when the terminal device 10 is traveling at 80 km/h or higher, the determination accuracy degrades when the terminal device 10 is traveling in another speed range. For this reason, the collection unit 26 sequentially collects a predetermined number of latest characteristic amounts as learning data at each speed range. As a result, the collection unit 26 reduces such speed bias in learning data of the traveling state, and thus can achieve an improved accuracy of the stop determination with a model learned by using the learning data registered in the learning data database 12b.

When a single model is simply learned, it is unable to be determined whether this model is a model for performing optimum determination. It is presumed that parameters of a model for appropriately performing the stop determination dynamically change depending on, for example, the orientation of the terminal device 10, the specification of the vehicle C10, and a movement characteristic of the vehicle C10.

Thus, the learning unit 27 learns a model with new parameters by using the learning data registered in the learning data database 12b (step S403). Then, the learning unit 27 stores the learned model in the model database 12d. It is expected that, when the vehicle C10 is stopped, the value of "a_ver" and the reference direction are substantially equal to those of the gravitational acceleration, and the value of "a_hor" is substantially zero because there is no vibration from a road surface. When the vehicle C10 is traveling at a constant speed, it is presumed that the maximum values, the minimum values, and the standard deviations of "a_ver" and "a_hor" are different from those of the stopped vehicle C10, due to random vibration from a road surface. When the vehicle C10 is accelerating or decelerating, acceleration due to the acceleration or deceleration of the vehicle C10 is added to the gravitational acceleration; therefore, it is estimated that the magnitude of "a_ver" becomes larger than the gravitational acceleration, and "a_hor" is different from that of the stopped vehicle C10. Thus, the learning unit 27 can learn a model for determining whether the vehicle C10 is stopped based on the average values, the minimum values, the maximum values, and the standard deviations of "(a_ver, a_hor)".

The terminal device 10 sets, without calculating the gravitational direction and the traveling direction of the vehicle C10, the direction of the average vector as a reference direction for performing the stop determination. As a result of any error in the direction of the average vector G and the direction of the gravitational acceleration, a difference is generated between a characteristic amount acquired when the vehicle C10 is traveling at a constant speed or is accelerating or decelerating, and a characteristic amount acquired when the vehicle C10 is stopped. Thus, a terminal device 10 can learn a model that allows the stop determination with higher accuracy.

Subsequently, the learning unit 27 calculates the correctness rate of each model by using the test data registered in the test data database 12c (step S404), and registers the calculated correctness rate in the model database 12d. For example, the learning unit 27 inputs all pieces of learning data into each model to calculate a stopping correctness rate, which is a ratio of determination of the stopped state when test data indicating the stopped state, is input to the model, and a traveling correctness rate, which is a ratio of determination of the traveling state when test data indicating the traveling state, is input to the model. Then, the learning unit 27 calculates a correctness rate as the sum of the integrated value of the stopping correctness rate and a predetermined coefficient $\beta$ and the integrated value of the traveling correctness rate and a predetermined coefficient $\alpha$. The coefficient $\alpha$ and the coefficient $\beta$ are set such that the sum thereof is "1" and adjusted depending on which of the stop and traveling determinations is weighted.

Subsequently, the learning unit 27 selects a model having the highest correctness rate from among the models registered in the model database 12d (step S405), and sets "1" to a use flag associated with the selected model.

As a result of such learning processing, the determination unit 25 can determine the traveling state of the terminal device 10 by using a predetermined number of characteristic amounts collected at each traveling speed of the terminal device 10. The determination unit 25 can determine the traveling state of the terminal device 10 by using a model having the highest correctness rate among the models stored in the model database 12d.

The determination unit 25 starts the stop determination by using a model having a use flag of "1" among the models registered in the model database 12d, for example, at activation of an application that achieves the various types of processing described above. In other words, the terminal device 10 stores therein information indicating a model selected at the previous activation of the application, and resumes the stop determination by using the model indicated by the stored information. As a result, the terminal device 10 can eliminate a time duration in which the stop determination is unable to be performed.

If the number of pieces of learning data indicating the traveling state and the number of pieces of learning data indicating the stopped state reach predetermined numbers as a result of the collection by the collection unit 26, the learning unit 27 may execute the learning processing described above to generate a model. Thereafter, the learning unit 27 may delete all data registered in the learning data database 12b, and then repeat learning of a model once the collection unit 26 finishes collecting the sufficient amount of new learning data again.

The collection unit 26 may collect test data. For example, the collection unit 26 may register a characteristic amount collected when the traveling speed of the terminal device 10 is "0" as test data indicating the stopped state in the test data database 12c, and may register a characteristic amount collected when the traveling speed of the terminal device 10 is in a predetermined range (for example, 5 km/h or higher) as test data indicating the traveling state in the test data database 12c. The collection unit 26 may replace the oldest test data among the test data registered in the test data database 12c with a newly collected characteristic amount.

Subsequently, the update unit 28 updates a model having the lowest correctness rate among a plurality of models stored in the model database 12*d* to a newly learned model (step S406). For example, the update unit 28 deletes the model having the lowest correctness rate among the models stored in the model database 12*d*, and generates a new model having parameters different from those of any model registered in the model database 12*d*. Then, the update unit 28 registers this new model in the model database 12*d*.

A newly registered model has a fewer number of learning times than those of other models and thus is expected to have a lower correctness rate. Thus, the update unit 28 does not need to perform the model update if the finally registered model has the lowest correctness rate of a plurality of models stored in the model database 12*d*. With such processing, the terminal device 10 can maintain possibility of improving the accuracy of the stop determination.

The learning processing illustrated in FIG. 9 may be executed at a certain timing and a certain scale. For example, the terminal device 10 may always execute the processing at steps S401 and S402, and execute the processing at step S403 or later if the rate of collection of learning data becomes equal to or larger than a predetermined threshold in each speed range. Alternatively, the terminal device 10 may repeatedly execute the processing at step S403 or later in a constant cycle.

3. Exemplary Time Until Determination Start

The following describes an exemplary time until the terminal device 10 starts the stop determination with reference to FIG. 10. FIG. 10 is a diagram illustrating an exemplary time until the stop determination in started. For example, in a method using the conventional model as illustrated in (A) of FIG. 10, for a while after activation as illustrated in (B) of FIG. 10, the traveling direction of the vehicle C10 is specified based on the acceleration measured while the vehicle C10 is traveling, and the stop determination starts after the traveling direction is specified. With this configuration, as illustrated in (C) of FIG. 10, the stop determination is unable to start until the traveling direction of the vehicle C10 is specified.

In processing according to the present embodiment as illustrated in (D) of FIG. 10, however, a conversion expression that aligns the negative x-axis direction with the direction of the average vector G is periodically calculated while the traveling direction is not specified as illustrated in (E) of FIG. 10, and simultaneously, characteristic amounts (the average value, the minimum value, the maximum value, and the standard deviation of the magnitude of acceleration) are calculated in a similar cycle as illustrated in (F) of FIG. 10. Then, the calculated characteristic amounts are used to execute the stop determination. This configuration allows the terminal device 10 to swiftly start the stop determination. If information indicating a previously used model is stored, the terminal device 10 can start the stop determination right after the activation by using the previously used model as illustrated in (G) of FIG. 10.

In this manner, the terminal device 10 sets the reference direction based on the average value of acceleration, and acquires a characteristic amount based on acceleration in a direction with respect to the reference direction. Then, the terminal device 10 performs the stop determination by using the acquired characteristic amount. This configuration allows the terminal device 10 to swiftly execute the stop determination without specifying the traveling direction to calculate the rotation matrix that converts the terminal coordinate system into the vehicle coordinate system.

The terminal device 10 can perform the atop determination without calculating the direction of the gravitational acceleration and the traveling direction of the vehicle C10. For example, the terminal device 10 converts the terminal coordinate system into the estimation coordinate system based only on measured acceleration, in other words, a coordinate system independent of a change in the orientation of the terminal device 10. As a result, the terminal device 10 performs the coordinate conversion that absorbs the influence of a change in the orientation of the terminal device 10, and thus can achieve the stop determination irrespective of the change in the orientation of the terminal device 10. In particular, the terminal device 10 periodically calculates the rotation matrix, and thus can eliminate the need for another learning of a model for performing the stop determination based on a characteristic amount dependent on the direction of the gravitational acceleration and the traveling direction of the vehicle C10, in other words, a characteristic amount that requires a time for acquisition and specification thereof. As a result, the terminal device 10 can perform the stop determination shortly after activation or an orientation change. In other words, the terminal device 10 does not need to learn the stop determination model each time an application is used. The terminal device 10 stores a model used at the last activation, thereby enabling a swift resuming of the stop determination by using the stored model.

4. Exemplary Expressions

The following describes, with reference to expressions, exemplary processing executed by the conversion unit 23 to calculate the rotation matrix that converts the terminal coordinate system into the estimation coordinate system. The processing executed by the conversion unit 23 is not limited to processing represented by the expressions below. For example, the conversion unit 23 may perform the coordinate conversion from the terminal coordinate system into the estimation coordinate system by using an expression of a linear transform.

For example, x-, y-, and z-axes represent the axes of the terminal coordinate system, and X-, Y-, and Z-axes represent the axes of the estimation coordinate system. With this notation, the processing of converting the estimation coordinate system into the terminal coordinate system is represented by Expression (1) below. In Expression (1), $\alpha$ represents a rotation angle about the x-axis, $\beta$ represents a rotation angle about the y-axis, $\gamma$ represents rotation angle about the z-axis, $R_x(\alpha)$ represents a rotation matrix that performs coordinate conversion through rotation about the x-axis, $R_y(\beta)$ represents a rotation matrix that performs coordinate conversion through rotation about the y-axis, and $R_z(\gamma)$ represents a rotation matrix that performs coordinate conversion through rotation about the z-axis.

$$\begin{pmatrix} x \\ y \\ z \end{pmatrix} = R_z(\gamma) R_y(\beta) R_x(\alpha) \begin{pmatrix} X \\ Y \\ Z \end{pmatrix} \qquad (1)$$

The rotation matrix $R_x(\alpha)$, the rotation matrix $R_y(\beta)$ and the rotation matrix $R_z(\gamma)$ (hereinafter also collectively referred to as "rotation matrices") can be represented by Expressions (2) to (4) below. In the estimation coordinate system, the negative x-axis direction just needs to be aligned with the direction of the average vector G, and thus $\alpha$ can be set to an arbitrary value.

$$R_x(\alpha) = \begin{pmatrix} 1 & 0 & 0 \\ 0 & \cos\alpha & -\sin\alpha \\ 0 & \sin\alpha & \cos\alpha \end{pmatrix} \quad (2)$$

$$R_y(\beta) = \begin{pmatrix} \cos\beta & 0 & \sin\beta \\ 0 & 1 & 0 \\ -\sin\beta & 0 & \cos\beta \end{pmatrix} \quad (3)$$

$$R_z(\gamma) = \begin{pmatrix} \cos\gamma & -\sin\gamma & 0 \\ \sin\gamma & \cos\gamma & 0 \\ 0 & 0 & 1 \end{pmatrix} \quad (4)$$

The direction of the average vector G is aligned with acceleration in the negative X-axis direction, and thus can be represented by the following Expression (5) in the estimation coordinate system.

$$\begin{pmatrix} X \\ Y \\ Z \end{pmatrix} = \begin{pmatrix} -G \\ 0 \\ 0 \end{pmatrix} \quad (5)$$

$(a_x, a_y, a_z)$ represents the average vector G in the axial directions detected in the terminal coordinate system. In this case, $a_x$, $a_y$, and $a_z$ are the values obtained by converting the average vector G in Expression (5) through the rotation matrices, and thus the following Expression (6) holds.

$$\begin{pmatrix} a_x \\ a_y \\ a_z \end{pmatrix} = R_z(\gamma)R_y(\beta)R_x(\alpha)\begin{pmatrix} -G \\ 0 \\ 0 \end{pmatrix} = \begin{pmatrix} -G\cos\beta\cos\gamma \\ -G\cos\beta\sin\gamma \\ G\sin\beta \end{pmatrix} \quad (6)$$

As a result, Expression (7) is obtained from the value in the z-axis direction in Expression (6).

$$\sin\beta = \frac{a_z}{G} \quad (7)$$

Expression (8) holds when the magnitude of the average vector G is taken into consideration, and thus Expression (9) is obtained from the values in the x-axis and y-axis directions in Expression (6). As a result, the terminal device 10 can specify the rotation angle $\gamma$ about the y-axis from Expressions (7) and (9).

$$G^2 = a_x^2 + a_y^2 + a_z^2 \quad (8)$$

$$\cos\beta = \pm\sqrt{1 - \left(\frac{a_z}{G}\right)^2} = \pm\frac{\sqrt{a_x^2 + a_y^2}}{G} \quad (9)$$

A positive value among the values in Expression (9) is selected as a solution. Then, Expressions (10) and (11) are obtained from the values in the x-axis and y-axis directions in Expression (6). As a result, the terminal device 10 can specify the rotation angle $\gamma$ about the z-axis from Expressions (10) and (11).

$$\sin\gamma = -\frac{a_y}{\sqrt{a_x^2 + a_y^2}} \quad (10)$$

$$\cos\gamma = -\frac{a_x}{\sqrt{a_x^2 + a_y^2}}. \quad (11)$$

The processing of converting the terminal coordinate system into the estimation coordinate system is the inverse transform of the coordinate conversion in Expression (1), and thus is represented by Expression (12) below.

$$\begin{pmatrix} X \\ Y \\ Z \end{pmatrix} = R_x(-\alpha)R_y(-\beta)R_z(-\gamma)\begin{pmatrix} x \\ y \\ z \end{pmatrix} \quad (12)$$

The values of $\beta$ and $\gamma$ can be calculated from Expressions (7), (9), (10), and (11), and thus Expression (13) is obtained when rotating only y- and x-axes of the acceleration samples of $a_x$, $a_y$, and $a_z$ in the terminal coordinate system and converting them into the estimation coordinate system. In other words, the terminal device 10 converts the terminal coordinate system into the estimation coordinate system by using the rotation matrices Ry($\beta$) and Rz($\gamma$).

$$\begin{pmatrix} x \\ y \\ z \end{pmatrix} = R_y(-\beta)R_z(-\gamma)\begin{pmatrix} a_x \\ a_y \\ a_z \end{pmatrix} \quad (13)$$

5. Modification

The terminal device 10 according to the embodiment described above may be achieved in various kinds of different embodiments other than the above-described embodiment. The following describes embodiments of the terminal device 10 other than the above-described embodiment.

5-1. Use of General-Purpose Model

In order to perform the stop determination at an initial activation of the application that achieves the above-described processing, the terminal device 10 may perform activation of an application including a general-purpose model. With execution of such an application, the terminal device 10 starts the stop determination by using the general-purpose model at the initial activation, and thereafter executes the stop determination by using a model learned for the terminal device 10.

5-2. Use of Learning Model

The terminal device 10 may determine whether the vehicle is stopped based on the magnitude of acceleration on the horizontal plane vertical to the reference direction without learning of a model for performing the stop determination. For example, the terminal device 10 may convert the reference direction into the gravitational direction by calculating the average vector G of acceleration when the vehicle is stopped, and determine that the vehicle is stopped if the magnitude of acceleration on the horizontal plane is smaller than a predetermined threshold. In this manner, the terminal device 10 determines the traveling state of the vehicle C10 by using a characteristic amount based on acceleration in a direction with respect to the reference direction by setting the reference direction to be the average vector G of the acceleration measured in the terminal coordinate system.

The terminal device 10 may thus perform the determination with a certain processing configuration without using a model.

The terminal device 10 described above collects learning data for performing learning of a model. Meanwhile, the terminal device 10 may restrict learning data to be collected so as to improve the model determination accuracy. For example, the terminal device 10 may discard, without setting as learning model, a characteristic amount acquired when a speed specified by using the GPS is included in the range of 1 km/h to 3 km/h.

The terminal device 10 may weight speed ranges in which learning data is collected. For example, the terminal device 10 may set the number of pieces of learning data collected in the "stopped state" to be larger than the number of pieces of learning data collected in the "traveling state". For example, the terminal device 10 may set the number of pieces of learning data collected in the range of "5 km/h to 15 km/h" to be larger than the number of pieces of learning data collected in the range of "55 km/h or higher", so as to improve the accuracy of determination of the stopped state and the traveling state.

The terminal device 10 may set, at each speed range, a duration in which learning data is collected and the width of the duration in which used learning data is collected. For example, the terminal device 10 may use learning data collected until five minutes before as learning data for "55 km/h or higher", and may use learning data collected until 12 minutes before as learning data for "25 km/h to 35 km/h". Irrespective of the speed ranges, the terminal device 10 may perform learning of a model by using learning data for which a predetermined time has not passed after its collection, and discard learning data for which the predetermined time has passed after its collection. The number of pieces of data to be collected, the widths and number of speed ranges, and a time duration in which collected or used learning data is acquired, for example, are not limited by the type of a model to be learned, but may be set as appropriate. The terminal device 10 may store therein a plurality of models learned by using pieces of learning data collected in different durations.

In the above description, the terminal device 10 performs the learning of the SVM as a model for performing the stop determination. However, the embodiment is not limited thereto. For example, the terminal device 10 may use learning of a neural network, and what is called deep learning. Specifically, the terminal device 10 may perform, by using learning data, learning of a neural network such as a deep neural network (DNN) for performing the stop determination.

For example, the terminal device 10 may perform, by using learning data, learning of a model for estimating the traveling speed of the vehicle C10. For example, the terminal device 10 performs learning of the DNN so that, when collected learning data is input, a node in an output layer corresponding to a speed range in which this learning data is collected responds to the input. Then, the terminal device 10 may output a speed range corresponding to a node in an output layer that has responded when an acquired characteristic amount is input, as an estimation result of a speed range in which the vehicle C10 travels. The terminal device 10 may perform, for example, learning of a DNN for estimating the traveling speed of the vehicle C10, in accordance with a temporal shift of the acquired characteristic amount. Alternatively, the terminal device 10 may learn, by using a characteristic amount, a plurality of SVMs for determining whether the vehicle C10 is traveling in a predetermined speed range, and may estimate a speed range in which the vehicle C10 travels by using the learned SVMs.

The terminal device 10 may perform learning of a model at a certain timing. For example, the terminal device 10 is capable of storing therein 180 pieces of learning data. The terminal device 10 performs relearning of a model when 60 pieces of learning data are collected, when 120 pieces of learning data are collected, and when 180 pieces of learning data are collected. Then, when the learning of a model is performed by using the 180 pieces of learning data, the terminal device 10 may discard all of the stored learning data, and perform collection of new learning data. For safety, the terminal device 10 may determine that the vehicle C10 is always in the stopped state, when the learning of a model is not being performed.

When the GPS becomes unavailable, the terminal device 10 may estimate the traveling speed of the vehicle C10 by using a traveling speed specified lastly through the GPS and a result of the determination through a model. For example, when the terminal device 10 enters a tunnel and the GPS becomes unavailable, the terminal device 10 calculates a speed specified again through the GPS, in other words, a tunnel entering speed that is the speed at entering the tunnel, sets the calculated tunnel entering speed to be a previously output speed, and travels forward the current position.

For example, when the GPS becomes unavailable, the terminal device 10 selects 10 speeds previously calculated by using the GPS, in a reverse chronological order of the calculation. Then, the terminal device 10 sorts the selected speeds in ascending order, and sets the tunnel entering speed to be the eighth speed from a lowest speed. Alternatively, the terminal device 10 may set a highest value of the tunnel entering speed.

If it is determined through a model that the vehicle is in the stopped state, the terminal device 10 determines whether any of conditions below is satisfied. Specifically, the terminal device 10 determines whether the previously output speed is lower than 10 km/h, whether the previously output speed is lower than 20 km/h and the previous determination by the model indicates that the vehicle is in the stopped state, or whether the previously output speed is lower than 30 km/h and results of the previous determination and the determination before the previous determination by the model indicate that the vehicle is in the stopped state. Then, if any of these conditions is satisfied, the terminal device 10 determines that the vehicle has stopped, and sets the previously output speed to 0 km/h.

If none of the conditions is satisfied, the terminal device 10 determines whether the results of the previous determination and the determination before the previous determination indicate that the vehicle is in the stopped state. If it is determined that the vehicle is in the stopped state, the terminal device 10 sets the previously output speed to half thereof. If the previous determination result indicates that the vehicle is in the stopped state, the terminal device 10 sets the previously output speed to two-thirds thereof. Thereafter, the terminal device 10 determines that the vehicle is traveling at the previously output speed.

In other words, if it is determined that the vehicle is in the stopped state, the terminal device 10 stops the vehicle only when the tunnel entering speed is lower than 10 km/h, and otherwise gradually decreases the speed. If is determined through a model that the vehicle is in the traveling state, the terminal device 10 adds one-fifth of the tunnel entering speed to the previously output speed with the upper limit being set at the tunnel entering speed.

5-3. Characteristic Amount

The terminal device 10 described above sets characteristic amounts to be the average value, the minimum value, the maximum value, and the standard deviation of the magnitude of acceleration in a direction with respect to the direction of the average vector G. However, the embodiment is not limited thereto. For example, the terminal device 10 may simply set the magnitude of acceleration as a characteristic amount. Alternatively, for example, the terminal device 10 may set at least one of the average value, the minimum value, the maximum value, and the standard deviation as a characteristic amount, or may set a certain combination of these values as a characteristic amount.

The terminal device 10 described above may use different characteristic amounts for "a_ver" and "a_hor". For example, the terminal device 10 may set the minimum value of "a_ver" as a characteristic amount, or may set the standard error in the value of "a_ver" as a characteristic amount depending on a condition. Alternatively, the terminal device 10 may set all of the average value, the minimum value, the maximum value, and the standard deviation of the value of "a_hor" as characteristic amounts. Alternatively, the terminal device 10 may use different characteristic amounts in accordance with the traveling condition of the vehicle C10. In other words, the terminal device 10 may select, as appropriate, a characteristic amount of a kind effective in determining whether the vehicle C10 is traveling.

5-4. Processing Interval

The terminal device 10 described above executes the determination processing and the learning processing at, for example, one second interval. However, the embodiment is not limited thereto, and the terminal device 10 may execute the determination processing and the learning processing at a certain timing. For example, the terminal device 10 may execute the stop determination through the GPS, and constantly execute the stop determination through a model to execute the learning processing when the model has a correctness rate lower than a predetermined threshold.

5-5. Management of Orientation Change

The terminal device 10 may specify the orientation of the terminal device 10. For example, if acceleration is averaged over a certain duration, the direction of the average vector G is aligned with the direction of the gravitational acceleration. Thus, the terminal device 10 may compare, for example, the direction of the average vector of all acceleration measured so far from activation of an application and the direction of the average vector of acceleration detected in the last one second. The terminal device 10 may then determine that the orientation of the terminal device 10 has changed if the directions have a difference between them equal to or higher than an angle of 37° (in other words, the cosine of an angle between the average vectors is smaller than 0.8).

At the determination of such an orientation change, the terminal device 10 deletes the learning data registered in the learning data database 12b and the models registered in the model database 12d, and performs collection of new learning data and model learning. As a result, the terminal device 10 can reduce degradation in the determination accuracy when an orientation change occurs.

5-6. Stopper Function

When the traveling state of the vehicle C10 is determined by the determination processing described above, in some cases, a result of the determination deviates from the actual traveling state, in other words, navigation is in an uncontrolled state. For this reason, the terminal device 10 may be equipped with a stopper function for preventing the uncontrolled state of navigation. For example, the terminal device 10 may be equipped with an elapsed time stopper function for forcibly stopping estimated movement of the current position when a predetermined time (for example, 300 seconds when navigation is performed, or 120 seconds when no navigation is performed) has passed since the start of the determination of the traveling state.

The terminal device 10 may cancel the elapsed time stopper function when entering a particular long tunnel so as to prevent the forced stop by the elapsed time stopper in the tunnel. For example, the terminal device 10 lets a first region at the entrance of a particular tunnel, and cancels the elapsed time stopper when the current position of the vehicle C10 overlaps the first region. In addition, the terminal device 10 sets a second region at the exit of the particular tunnel to activate again the elapsed time stopper when the current position of the vehicle C10 overlaps the second region.

When the speed of the vehicle C10 is estimated, the tunnel entering speed can be set lower than the actual speed when entering a tunnel right after a toll at an expressway entrance. For this reason, the terminal device 10 may set information indicating the speed of the vehicle C10 passing through the tunnel, at the first region set at the entrance of the tunnel, and set the traveling speed of the vehicle C10 to be the speed indicated by the information set at the first region when the current position of the vehicle C10 overlaps the first region. In addition, the terminal device 10 may set, at the first region, a time until the forced stop is performed by the elapsed time stopper, and may cancel the forced atop by the elapsed time stopper until it passes the time indicated by information set at the first region when the current position of the vehicle C10 overlaps the first region.

If the GPS does not become unavailable until a predetermined time passes after the current position of the vehicle C10 overlaps the first region, the terminal device 10 may determine that the vehicle C10 has not entered a tunnel without canceling the elapsed time stopper nor setting the traveling speed of the vehicle C10. The terminal device 10 may set a speed setting region in a tunnel, and set the traveling speed of the vehicle C10 to a speed indicated at the speed setting region when the current position of the vehicle C10 overlaps the speed setting region, and reset the time until the forced stop is performed by the elapsed time stopper to a predetermined time. The terminal device 10 may set regions such as the first region, the second region, and the speed setting region described above to a traffic intersection and a typical tunnel.

5-7. Other Embodiments

The above-described embodiment is merely exemplary, and the present embodiment includes configurations exemplarily described below and other configurations. For example, any functional configuration, any data structure, and the order and content of any processing illustrated in a flowchart in the present application are merely exemplary. The inclusion and arrangement of each component and the execution order and specific content of processing, for example, are changeable as appropriate. For example, the navigation processing and the determination processing described above can be achieved as a device, a method, or a program on a terminal achieved by an application on a smartphone, in addition to the terminal device 10 as exemplarily illustrated in the above-described embodiment.

Typically, the processing units 17 to 20 included in the terminal device 10 may be each achieved by an independent device. The units 21 to 25 included in the traveling state determination unit 20 may be each achieved by an independent device. Similarly, any configuration according to the present embodiment may be flexibly changed by calling, for example, an external platform through an application program interface (API) or network computing (what is called cloud) to achieve each means described in the embodiment. Each component such as means according to the present embodiment may be achieved by any other information processing mechanism such as a physical electric circuit, in place of a computing control unit of a computer.

For example, the terminal device 10 may execute the navigation processing described above in cooperation with the delivery server capable of communicating with the terminal device 10. For example, the delivery server includes the collection unit 26, the learning unit 27, and the update unit 28, and may collect a characteristic amount from acceleration detected by the terminal device 10, perform learning of a model using the collected characteristic amount, and deliver the learned model to the terminal device 10. The delivery server includes the detection unit 21, the setting unit 22, the conversion unit 23, the acquisition unit 24, and the determination unit 25, and may deliver, to the terminal device 10, a traveling direction and a traveling speed estimated based on the acceleration detected by the terminal device 10, and execute navigation of the user. The delivery server may execute the determination processing described above in place of the terminal device 10 and transmit a result of the execution to the terminal device 10 to cause the terminal device 10 to execute the navigation processing.

When a plurality of terminal devices are that execute the navigation processing and the determination processing in cooperation with the delivery server, the delivery server may use a different SVM for each terminal device to determine whether the terminal device is traveling. The delivery server may collect position information acquired by each terminal device through the GPS, determine whether the terminal device is traveling based on the collected position information, and achieve learning of the SVM by using a result of the determination and acceleration collected from the terminal device.

6. Effects

As described above, the terminal device 10 detects acceleration, sets a reference direction based on the detected acceleration, acquires a characteristic amount based on the acceleration in a direction with respect to the set reference direction, and determines the traveling state of the terminal device 10 by using the acquired characteristic amount. Thus, the terminal device 10 can easily determine a traveling state irrespective of the installation orientation of the terminal device 10. In other words, the terminal device 10 can easily determine the traveling state irrespective of the installation orientation of the terminal device 10 by performing the coordinate conversion that absorbs the influence of an orientation change without specifying the traveling direction of the vehicle C10 and the gravitational direction.

The terminal device 10 sets the reference direction by using the average value of detected acceleration. Thus, the terminal device 10 can easily determine the traveling state by setting the reference direction irrespective of the installation orientation of the terminal device 10.

The terminal device 10 uses a rotation matrix that aligns a predetermined axial direction in which acceleration is detected with a set reference direction, so as to convert the detected acceleration into acceleration in a direction with respect to the reference direction, and acquire a characteristic amount based on the converted acceleration. Thus, the terminal device 10 can determine the traveling state of the vehicle C10 based on a versatile characteristic amount irrespective of, for example, the installation orientation of the terminal device 10 and the traveling direction of the vehicle C10.

The terminal device 10 acquires a characteristic amount based on the magnitude of acceleration in the direction with respect to the reference direction. The terminal device 10 also acquires a characteristic amount based on acceleration on an estimation plane vertical to the reference direction. More specifically, the terminal device 10 acquires a characteristic amount based on a pair of the magnitude of acceleration in the reference direction and the magnitude of acceleration in the direction (for example, on the horizontal plane) with respect to the reference direction. Thus, the terminal device 10 can determine the traveling state of the vehicle C10 based on a characteristic amount irrespective of, for example, the installation orientation of the terminal device 10 and the traveling direction of the vehicle C10.

The terminal device 10 determines the traveling state of the terminal device 10 based on at least one of the average value, the maximum value, the minimum value, and the standard deviation of the magnitude of acceleration. Thus, the terminal device 10 can easily determine the traveling state of the vehicle C10 irrespective of whether the vehicle is stopped, traveling, accelerating, or decelerating.

The terminal device 10 determines the traveling state of the terminal device 10 by using a model that has learned a characteristic of a characteristic amount. In other words, the terminal device 10 determines the traveling state of the vehicle C10 by using a model independent of a change in the orientation of the terminal device 10. Thus, the terminal device 10 can reduce, for example, a time taken to start the traveling determination.

The terminal device 10 collects a predetermined number of characteristic amounts acquired at each traveling speed of the terminal device 10, and determines the traveling state of the terminal device 10 by using the predetermined number of characteristic amounts collected at each traveling speed of the terminal device 10. Thus, the terminal device 10 can prevent degradation in the determination accuracy generated by the bias in the traveling speed.

The terminal device 10 sequentially collects a predetermined number of latest characteristic amounts from among acquired characteristic amounts at each traveling speed of the terminal device 10. Thus, the terminal device 10 can gradually improve the determination accuracy in each speed range.

The terminal device 10 stores therein a plurality of models learned based on characteristic amounts and used to determine the traveling state. Then, the terminal device 10 determines the traveling state by using a model having the highest correctness rate among the stored models. The terminal device 10 also updates a model having the lowest correctness rate among the stored models to a newly learned model. Thus, the terminal device 10 can determine the traveling state of the vehicle C10 with accuracy.

When the determination of the traveling state of the terminal device 10 is stopped, the terminal device 10 stores therein a flag indicating a used model. Then, if the determination of the traveling state of the terminal device 10 is resumed, the terminal device 10 determines the traveling state of the terminal device 10 by using the model indicated by the stored flag. Thus, the terminal device 10 can start the determination of the traveling state of the vehicle C10 upon activation of the application that performs the determination of the traveling state, without learning a model and specifying the traveling direction of the vehicle C10.

In the above, embodiments of the present application are described in detail with respect to the drawings, but these embodiments are merely exemplary. In addition to the configurations described in the disclosure of the embodiment, the present embodiment can be achieved in other configurations provided with various kinds of changes and modifications based on the knowledge of the skilled person in the art.

Any "unit" in the above description may be replaced with "means" or "circuit". For example, "traveling state determination unit" may be replaced with "traveling state determination means" or "traveling state determine circuit".

According to an embodiment, the traveling state of a vehicle can be determined irrespective of the installation orientation of a terminal device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A determination device comprising:
a processor programmed to:
  detect, by a sensor, acceleration;
  set a reference direction based on the detected acceleration;
  acquire a characteristic amount based on a pair of: (i) a magnitude of acceleration in a direction with respect to the set reference direction, and (ii) a magnitude of acceleration in the set reference direction; and
  determine a traveling state of a terminal device by using the acquired characteristic amount.

2. The determination device according to claim 1, wherein the processor is programmed to set the reference direction by using an average value of the detected acceleration.

3. The determination device according to claim 1, wherein the processor is programmed to:
  convert the detected acceleration into acceleration in a direction with respect to the reference direction by using a rotation matrix that aligns, with the set reference direction, a predetermined axial direction in which the acceleration is detected, and acquire the characteristic amount based on the converted acceleration.

4. The determination device according to claim 1, wherein the processor is programmed to acquire the characteristic amount based on acceleration on a plane vertical to the set reference direction.

5. The determination device according to claim 1, wherein the processor is programmed to determine the traveling state of the terminal device as the characteristic amount based on at least one of: an average value, a maximum value, a minimum value, and a standard deviation of magnitude of the acceleration.

6. A determination device comprising:
a processor programmed to:
  detect, by a sensor, acceleration;
  set a reference direction based on the detected acceleration;
  acquire a characteristic amount based on acceleration in a direction with respect to the set reference direction; and
  determine a traveling state of a terminal device by using a model that has learned a characteristic of the characteristic amount.

7. The determination device according to claim 6, further comprising a storage unit that stores a plurality of models learned based on the characteristic amount to determine the traveling state, wherein
  the processor is programmed to determine the traveling state by using a model having a highest correctness rate among the models stored in the storage unit.

8. The determination device according to claim 7, wherein the processor is programmed to update the model having a lowest correctness rate among the models stored in the storage unit to a newly learned model.

9. The determination device according to claim 7, wherein the processor is programmed to
  record information indicating the model when the determination of the traveling state of the terminal device is stopped; and
  determine the traveling state of the terminal device by using the model indicated by the recorded information when the determination of the traveling state of the terminal device is resumed.

10. A determination device comprising:
a processor programmed to:
  detect, by a sensor, acceleration;
  set a reference direction based on the detected acceleration;
  acquire a characteristic amount based on acceleration in a direction with respect to the set reference direction;
  collect a predetermined number of acquired characteristic amounts at each traveling speed of a terminal device; and
  determine a traveling state of the terminal device by using the predetermined number of characteristic amounts collected at each traveling speed of the terminal device.

11. The determination device according to claim 10, wherein the processor is programmed to sequentially collect a predetermined number of latest characteristic amounts from among the acquired characteristic amounts at each traveling speed of the terminal device.

12. A determination method comprising:
detecting acceleration;
setting a reference direction based on the detected acceleration;
acquiring a characteristic amount based on a pair of: (i) a magnitude of acceleration in a direction with respect to the set reference direction, and (ii) a magnitude of acceleration in the set reference direction; and
determining a traveling state of a terminal device by using the acquired characteristic amount.

13. A non-transitory computer readable storage medium having stored therein a determination program causing a computer to execute a process comprising:
detecting acceleration;
setting a reference direction based on the detected acceleration;
acquiring a characteristic amount based on a pair of: (i) a magnitude of acceleration in a direction with respect to the set reference direction, and (ii) a magnitude of acceleration in the set reference direction; and
determining a traveling state of a terminal device by using the acquired characteristic amount.

* * * * *